No. 664,829. Patented Jan. 1, 1901.
J. A. BROOKS.
BOILER HANDLE.
(Application filed Apr. 14, 1900.)
(No Model.)

Witnesses
J. A. Brooks Inventor
By his Attorneys,
C. A. Snow & Co.

UNITED STATES PATENT OFFICE.

JOSEPH A. BROOKS, OF WARREN, ILLINOIS.

BOILER-HANDLE.

SPECIFICATION forming part of Letters Patent No. 664,829, dated January 1, 1901.

Application filed April 14, 1900. Serial No. 12,888. (No model.)

*To all whom it may concern:*

Be it known that I, JOSEPH A. BROOKS, a citizen of the United States, residing at Warren, in the county of Jo Daviess and State of Illinois, have invented a new and useful Boiler-Handle, of which the following is a specification.

My invention is an improved handle for washboilers and other vessels, one object of my invention being to provide means for securing the metal ears to the ends of the grip-bar so that water cannot enter the joints between said ears and grip-bar, and a further object of my invention being to securely fasten the ears to the ends of the grip-bar so that they cannot become detached therefrom by use.

To these ends my invention consists in the combination with a grip-bar having annular studs on its ends shouldered to form annular flanges at the inner ends of said studs, ferrules forming caps on said annular studs, said ferrules having their inner sides swaged in said annular flanges and the ears having openings to receive said ferrules, said ears being soldered to said ferrules after the latter have been attached to the studs on the ends of the grip-bar.

My invention further consists in the peculiar construction and combination of devices hereinafter fully set forth, and pointed out in the claims.

Figure 1:
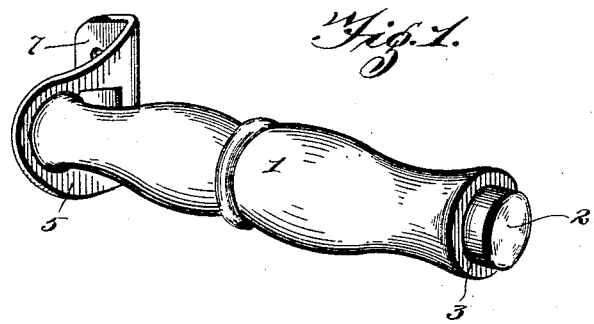
Figure 2:
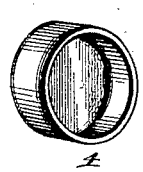
Figure 3:
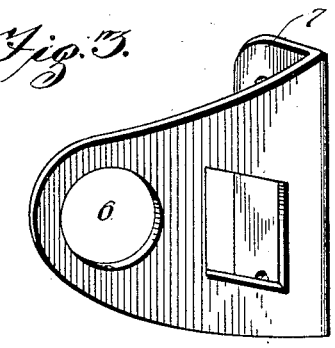
Figure 5:
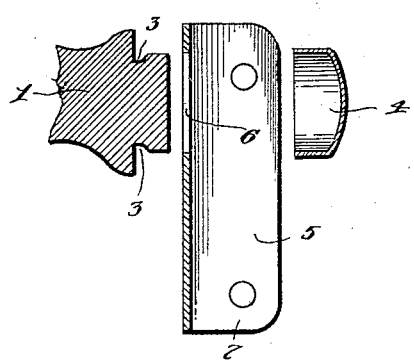
Figure 4:
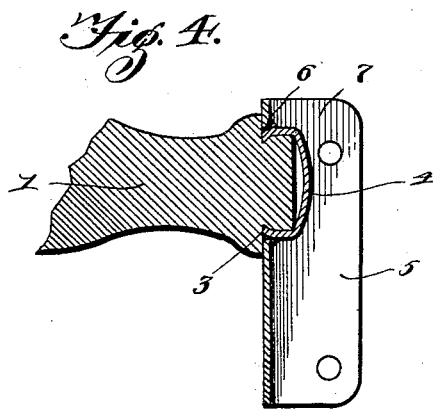

In the accompanying drawings, Figure 1 is a perspective view of a handle embodying my improvements, one of the ears and ferrules being removed from one end of the grip-bar. Fig. 2 is a detail perspective view of one of the ferrules from the inner side thereof. Fig. 3 is a similar view of one of the ears. Fig. 4 is a detail sectional view of a portion of the grip-bar, showing the ferrule and ear secured to one end thereof. Fig. 5 is a similar view of the grip-bar, ear, and ferrule separated.

In the embodiment of my invention I provide the grip-bar 1, which may be of any suitable form and either composed of wood or some other suitable material, with projecting studs 2 at its ends, said studs being shouldered at their inner sides by annular grooves 3, which are formed in them, as shown.

The metallic portions of my improved handle for washboilers and other vessels comprises ferrule 4 and ears 5. The said ferrules are adapted to fit on the studs 2 at the ends of the grip-bar and are stamped or struck up from suitable sheet metal in the manner well known to those skilled in the art. The ears 5 may be of any suitable size and configuration and are provided at their outer ends each with an opening 6 of a size which will adapt it to receive one of the ferrules, and said ears are provided at their outer sides with the bearing-faces 7, adapted to bear against and contact with the boiler or other vessel on which the handles are used and to be secured thereto by means of rivets or in any other suitable manner.

In assembling the parts of my improved handle the ferrules are first placed on the studs 2. The inner sides of said ferrules are then swaged inward and caused to enter the annular grooves 3, thereby firmly securing the ferrules on the said studs, and the ears are then placed in position on the ends of the handle with the ferrules in their openings 6. The joints between the ferrules and the ears are soldered, either by dipping the metallic portions of the handle into melted tin or other suitable material or by otherwise suitably soldering said joints, and the solder in filling said joints, as will be readily understood, effectually prevents moisture from entering between the grip-bar and the ears and ferrules, thereby preserving the grip-bar from decay and preserving the metallic portions of the handle contacting therewith from rust.

It will be understood from the foregoing and by reference to the drawings that when the joint between an ear and a ferrule is thus filled with the solder the inner swaged end of the ferrule is effectually prevented from opening, owing to strains exerted upon the handle when the vessel is in use, and that hence the said ears and ferrules cannot become disconnected from the ends of the grip-bar.

Having thus described my invention, I claim—

1. A handle comprising a grip-bar, ferrules crimped on the ends of the grip-bars and ears secured to said ferrules the latter being seated in openings in said ears, substantially as described.

2. In a handle, the combination with a grip-bar having shouldered projections at its ends, ferrules crimped on said shouldered projections and ears having openings to receive said ferrules, said ears secured to said ferrules, substantially as described.

3. A handle comprising a grip-bar having shouldered projections at its ends, ferrules crimped on said shouldered projections, ears having openings in which said ferrules are seated, said ears bearing against the ends of the grip-bar and the joints between said ferrules and said ears being filled, substantially as described.

4. The combination with a grip-bar having shouldered projections at its ends, of ferrules crimped on said shouldered projections and ears having openings in which said ferrules are seated, said ears preventing the crimped ferrules from expanding and thereby preventing said ears from being withdrawn from the said shouldered projections, substantially as described.

5. A grip-bar having projecting studs at its ends and grooves in the angles formed by said studs, ferrules on said studs and having their inner ends crimped or swaged in said grooves, whereby said ferrules are secured on said studs, and ears having openings forming the seats for said ferrules, said ears bearing against the ends of the grip-bar, the joints between said ears and the swaged or inturned ends of the ferrules being filled, as with solder, for the purpose set forth, substantially as described.

6. A grip-bar having a projecting end stud provided with an annular groove, a ferrule adapted to fit on said projecting stud and adapted to be crimped in said annular groove, and an ear having an opening adapted to receive the ferrule, all in combination, substantially as described.

7. A grip-bar having a shouldered projection, a ferrule crimped on said shouldered projection and an ear on said ferrule and locking the latter against expansion, whereby said ferrule and said ear are secured to said grip-bar, substantially as described.

8. A handle for washboilers and the like consisting of a grip-bar having shouldered end extensions, ferrules on said extensions crimped to engage the shoulders thereof, and ears having openings in which said ferrules are seated, the joints between said ears and said ferrules being filled with solder, substantially as described.

In testimony that I claim the foregoing as my own I have hereto affixed my signature in the presence of two witnesses.

JOSEPH A. BROOKS.

Witnesses:
WILLIAM WHITHAM,
A. A. SIGSBY.